No. 688,528. Patented Dec. 10, 1901.
P. H. KILE.
SAFETY HITCHING SNAP.
(Application filed June 24, 1901.)
(No Model.)

WITNESSES:
Wm H Payne
A. C. Bush

INVENTOR:
Phillip H. Kile,
BY E. T. Silvius,
ATTORNEY.

UNITED STATES PATENT OFFICE.

PHILLIP H. KILE, OF INDIANAPOLIS, INDIANA, ASSIGNOR OF ONE-HALF TO CHRISTOPHER C. LUTZ, OF INDIANAPOLIS, INDIANA.

SAFETY HITCHING-SNAP.

SPECIFICATION forming part of Letters Patent No. 688,528, dated December 10, 1901.

Application filed June 24, 1901. Serial No. 65,766. (No model.)

*To all whom it may concern:*

Be it known that I, PHILLIP H. KILE, a citizen of the United States, residing at Indianapolis, in the county of Marion and State of Indiana, have invented certain new and useful Improvements in Safety Hitching-Snaps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a device that is designed to be attached to and used with a strap, a chain, or the like for detachably connecting the same to other objects, such as rings or eyes.

My object is to generally improve the construction of hitching-snaps, and particularly to provide a compact, easily-operated, and durable snap that may be cheaply manufactured and which also may be easily repaired.

Another object is to provide a snap that may be suitable and reliable for use in connection with the harness and other appliances used in fire-departments.

Figure 1:
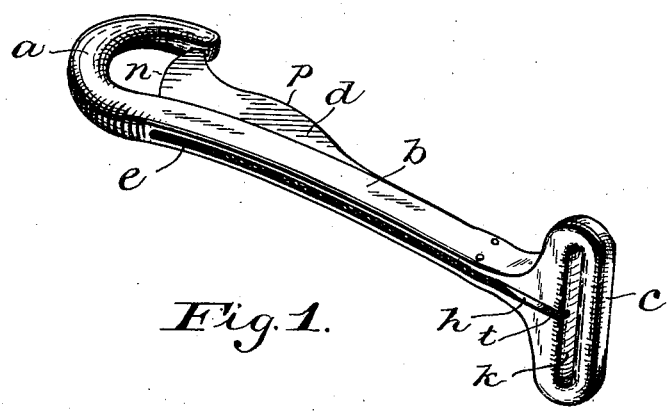
Figure 2:
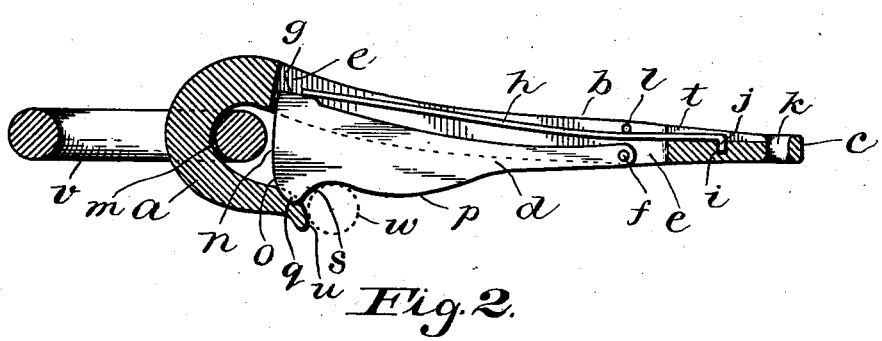
Figure 3:
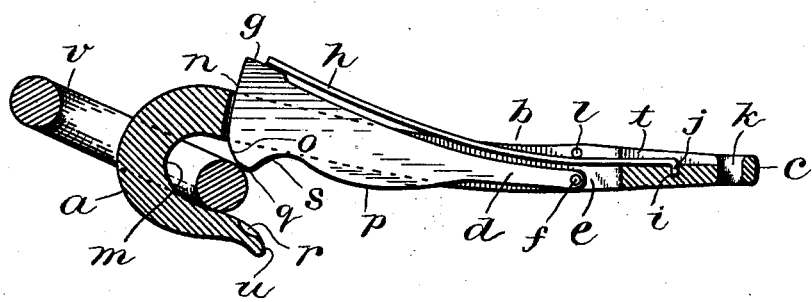

Referring to the drawings, Figure 1 is a perspective view of a safety hitching-snap constructed according to my invention; Fig. 2, a longitudinal sectional view showing the device connected to a ring; and Fig. 3, a similar view showing the operative parts of the device in the positions they would assume when about to disengage the snap-hook from a ring.

Similar reference-letters in the several figures of the drawings indicate corresponding parts.

In construction the snap essentially comprises a hook $a$, having an integral shank $b$, with a suitable tail $c$, a pivoted latch $d$, and a latch-spring $h$, all formed of suitable metal. The shank $b$ has a slot $e$ extending approximately from the hook portion $a$ to the tail portion $c$—that is to say, nearly to the opposite end of the piece comprising the frame or main part of the device. Extending transversely across the slot $e$ is a pivot-pin $f$, on which is mounted the latch $d$, having at the back of the end opposite to the end that is pivoted a spring-seat $g$, against which an end portion of a spring $h$ constantly presses, the opposite end portion of the spring having a lug $j$ inserted in a socket $i$ in the tail portion $c$, whereby the spring is prevented from longitudinal and rotative movements. The spring extends under a pin or lug $l$, so as to be practically between such pin and the back of the latch $d$, and it is under tension, thereby preventing accidental dislodgment of the lug $j$. The spring is preferably composed of spring-steel or other suitable metal having a circular cross-sectional area. The pin $l$ extends across the slot $e$ and is secured to the shank $b$. The tail $c$ has a groove $t$ for convenience in inserting the spring, and the socket $i$ is at the bottom of this groove. The tail $c$ has also an oblong aperture $k$ to receive a strap for attachment thereto, and it is obvious that I may form the tail in any suitable shape so as to adapt it to be attached otherwise to various articles.

The latch $d$ comprises a plate which is of less breadth at its pivoted end than at its operative end, and, as shown, its plan contour is peculiar. Its operative face $n$ is preferably curved as a segment of a circle struck from the pivot $f$ as a center, except that a portion of said face has a curved portion $o$, of less radius, extending to the point $q$, and near the point is a concave part $s$, near which is a convex part $p$, the latter serving as a thumb-piece for operating the latch. The latch is of such length as to provide but slightly more space between the inner part $m$ of the hook and the face $n$ of the latch than is required to receive the ring or link $v$—that is to say, the opening in the hook with the latch closed is approximately diametrically equal lengthwise of the device as it is to its diameter crosswise thereof. At the inner side of the hook, near the point $u$, is a recess $r$ to receive the point $q$ of the latch to prevent lateral play.

In practical use, assuming that it is desired to connect the snap to a ring $v$, the latch being closed or in its normal position, as shown in Fig. 2, the circle $w$ in dotted line may represent a cross-sectional view of a part of the ring $v$ to illustrate the ease with which the snap may be guided by the ring in case of haste or in darkness. If the portion s be thrust against the ring, the latch will be forced through the slot e, and if at the same time the snap is quickly pulled the ring will be forced past the points u and q into the hook and the latch will be forced by its spring h to close; also, the thumb-piece p may be pressed to open the latch for making the connection. When connected, it will be seen that a back thrust of the ring cannot tend to open the latch, since it will be exerted directly toward the pivot-pin f; but in disconnecting it will be seen that if the latch be pressed open sufficiently to permit the ring to act as a wedge against the curved portion o the ring may assist in performing the act more easily by pushing the snap toward the ring. When connected as shown, it will be seen that the ring cannot become twisted in the snap, and this is an advantage in this device. Neither can the ring be accidentally removed, as the face n is a positive bar. The elastic portion of the spring is designed to be abnormally long, so that there may be but little variation in the spring tension as between the open and closed positions of the latch.

These snaps or snap-hooks may be advantageously employed for many purposes and in many sizes, and it should be noted that the several parts should be approximately in the proportions shown, the latch fitting neatly in the slot, its length being so great that it may spring slightly laterally and work easily should there be unevenness of surfaces, neither the latch nor the slot being machined, as preferably made to the best advantage by casting, and the extremely long latch-spring removes the liability to rupture thereof in use. It will thus be seen that the snap has no parts that may become impaired in practical use.

Having thus described my invention, what I claim, and desire to secure by Letters Patent, is—

1. In a safety hitching-snap, the combination of the hook, the shank having the slot therein, the pivot-pin in the slot of said shank, the latch pivoted on said pin and having the operative face curved as a segment of a circle struck from said pin and the portion having a continuing curvature of lesser radius extending to the point thereof, the lug in the slot of said shank, the groove in the tail of said shank, and the spring secured in said groove and extending between said pivot-pin and said lug, substantially as set forth.

2. In a safety hitching-snap, the combination of the hook, the slotted shank having the aperture in the tail portion thereof, the groove in said tail portion extending into said aperture, the latch pivoted in said shank, the pin or lug secured to said shank, and the spring secured in said groove and extending against said pin or lug and engaging said latch, substantially as set forth.

3. In a safety hitching-snap, the combination of the hook, the slotted shank, the pivot-pin in the slot of said shank, the latch pivoted on said pin and having the spring-seat at the end thereof opposite the pivoted end and also opposite the point of the hook, the operative face of said latch curved as a segment of a circle struck from said pivot-pin and the portion having the continuing curvature of lesser radius, and the bar-spring engaging said seat and secured to said shank, substantially as set forth.

4. In a safety hitching-snap, the combination of the hook, the shank having the slot therein, the pivot-pin in the slot, the lug in the slot, the latch connected to said pivot-pin and having the spring-seat at the back of the end thereof opposite the pivoted end thereof, and the spring extending between said latch and said lug and engaging said spring-seat, substantially as set forth.

5. In a safety hitching-snap, the combination of the hook having the slotted shank with the tail portion, the latch pivoted in the slot of said shank, said tail portion having the groove and the socket in the groove, the pin or lug in the slot of said shank, and the bar-spring having the lug in said socket and extending in said groove and between said lug and said latch and pressing against the free end portion of said latch, substantially as set forth.

In testimony whereof I affix my signature in presence of two witnesses.

PHILLIP H. KILE.

Witnesses:
E. T. SILVIUS,
WM. H. PAYNE.